May 4, 1943.                    S. B. WINN                    2,318,038
                              TRACTOR-TRAILER
                            Filed Feb. 24, 1941                 4 Sheets-Sheet 2

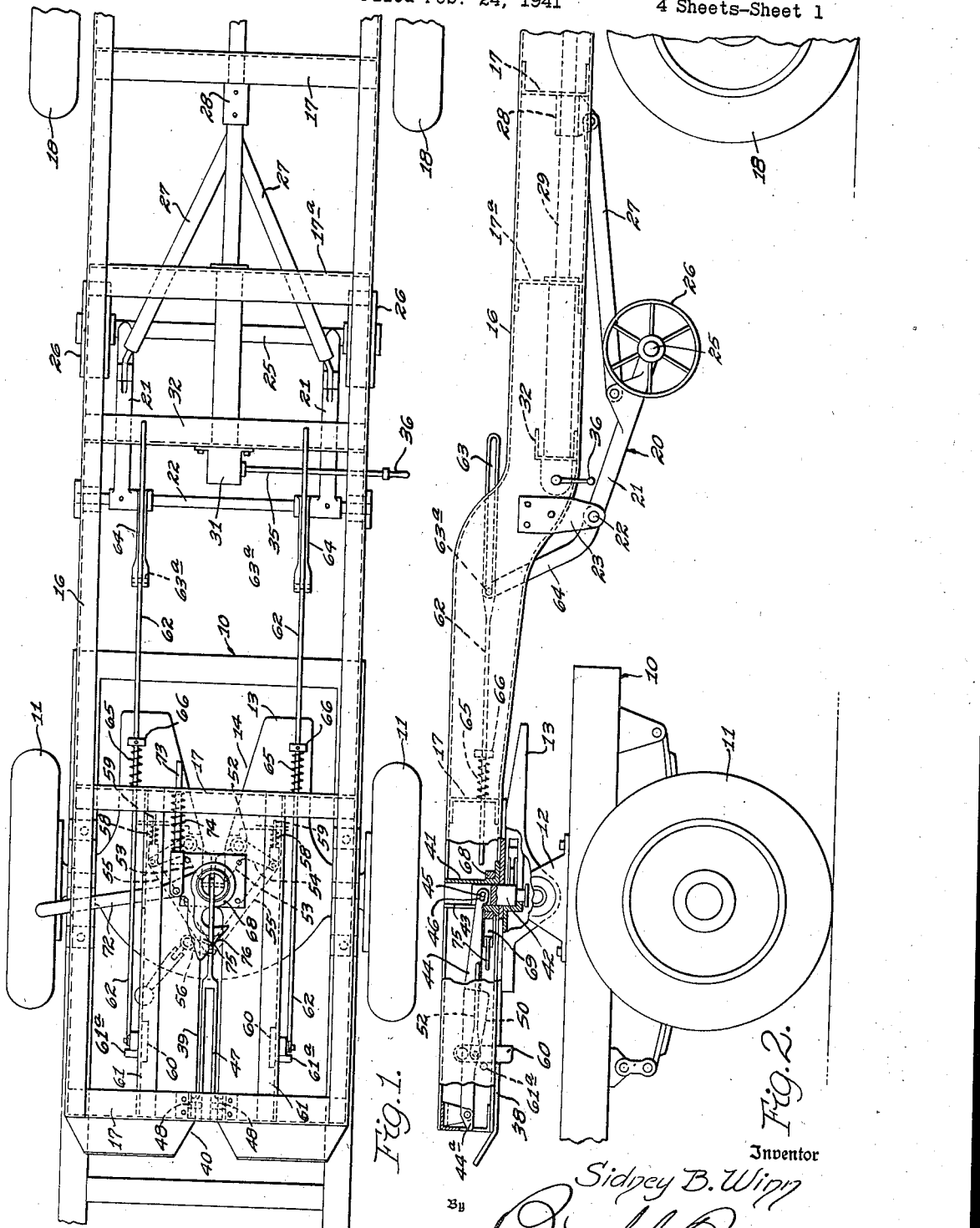

Inventor
Sidney B. Winn
By
         Attorneys

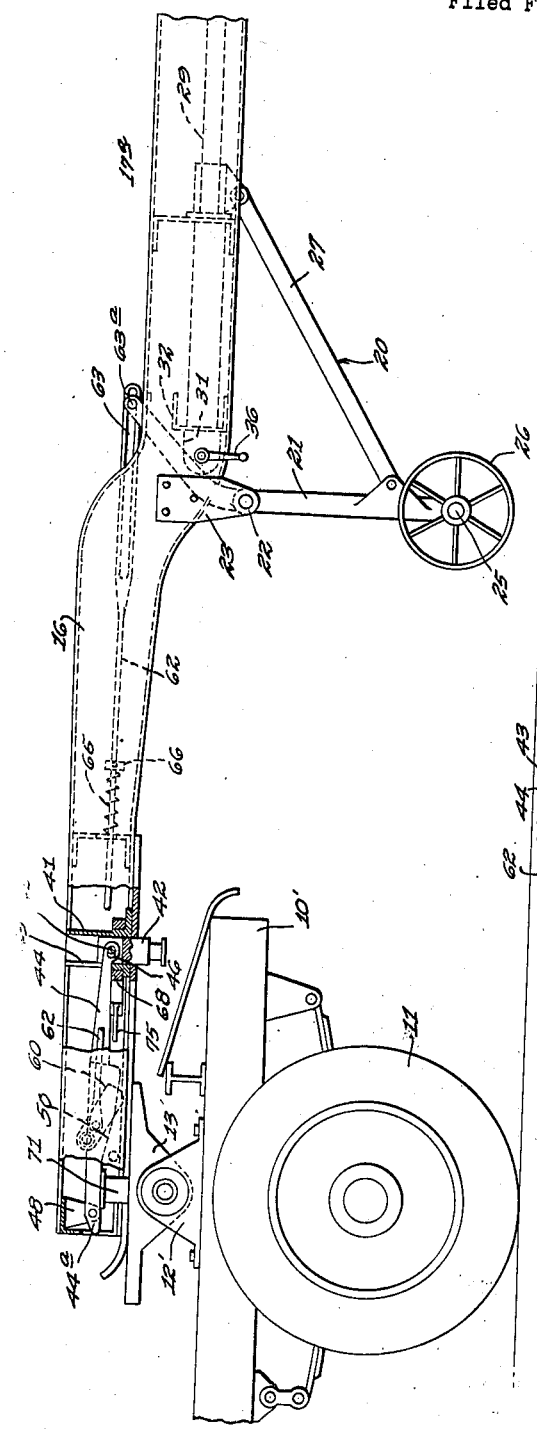

May 4, 1943.  S. B. WINN  2,318,038
TRACTOR-TRAILER
Filed Feb. 24, 1941  4 Sheets-Sheet 4
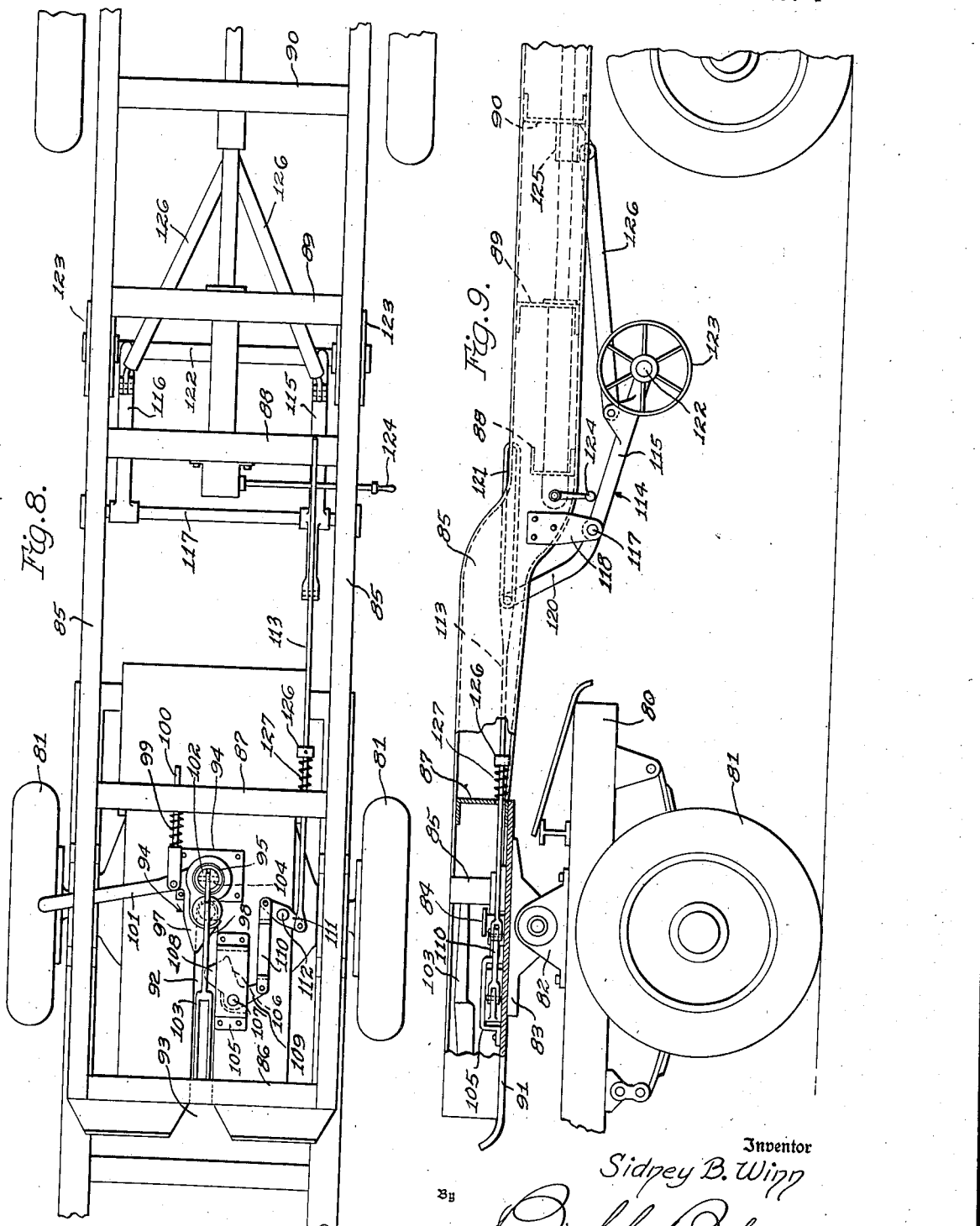

Patented May 4, 1943

2,318,038

UNITED STATES PATENT OFFICE 2,318,038

TRACTOR-TRAILER

Sidney B. Winn, Lapeer, Mich.

Application February 24, 1941, Serial No. 380,325

14 Claims. (Cl. 280—33.1)

This invention relates generally to tractor-trailer vehicles and more particularly to trailers.

It is an object of the present invention to provide a new and improved trailer of a character such that it may be coupled to a tractor having coupling jaw means or may be coupled to a tractor having a coupling king pin.

Another object of the invention is to provide a new and improved trailer of the above mentioned character in which the proper coupling means is automatically selected by and upon backing of the tractor beneath the trailer.

Another object of the invention is to provide safety means in conjunction with a trailer prop to prevent complete separation of a tractor and trailer in the event of failure of the coupling means.

Other objects of the invention will become apparent from the following detailed description taken in connection with the accompanying drawings in which:

Fig. 1 is a fragmentary top plan view of a tractor and trailer shown coupled together;

Fig. 2 is a fragmentary side elevational view of the tractor and trailer having parts broken away and in section;

Fig. 3 is a view similar to Fig. 1 but showing a tractor having a different type of coupling means;

Fig. 4 is a fragmentary side elevational view of the tractor and trailer shown in Fig. 3;

Fig. 5 is a fragmentary side elevational view partly broken away and in section of the tractor and trailer;

Fig. 6 is a cross sectional view of the tractor and trailer taken along the line 6—6 of Fig. 4;

Fig. 7 is a detail fragmentary view of the trailer frame taken along the line and in the direction of the arrows 7—7 of Fig. 3;

Fig. 8 is a top plan view of a trailer showing a modification of the invention; and Fig. 9 is a side view of the trailer having parts broken away and in section.

Referring to the drawings by characters of reference, the tractor illustrated in Figs. 1 and 2 includes the usual frame 10 supported by springs on wheels 11. Adjacent the rear end of the frame 10, brackets 12, rigidly secured thereto, pivotally support a fifth wheel plate member 13 for supporting the forward end of a trailer. The fifth wheel 13 of Figs. 1 and 2, unlike the fifth wheel 13' of Figs 3 to 6, is provided with a rearwardly opening king pin receiving slot 14.

The trailer includes a frame, which, if desired, may be a part of the body, comprising spaced longitudinal frame members 16 rigidly secured together by cross members 17 and 17a. The rear end of the trailer frame is supported by rear wheels 18 whereas the forward end of the trailer frame, when not being supported on the tractor fifth wheel 13 or 13', is supported by a retractible prop structure, designated in general by the numeral 20.

The prop structure includes spaced legs 21 which are pivoted on a transverse shaft 22, supported by brackets 23 which are respectively and rigidly secured to the frame side members 16. At their lower ends the legs 21 are connected together by a transverse shaft 25 on which ground-engaging wheels 26 are mounted. Above the wheels 26, ends of links 27 are pivotally connected respectively to the legs 21, the other ends of the links being pivotally connected to a bracket 28 of a traveller tube member 29 which is internally threaded to travel along a threaded rod or screw 30, extending longitudinally of and between the frame side members 16. A casing 31, rigidly secured to a frame cross member 32, encloses a pair of meshed gears 33 and 34 of which the gear 33 is mounted on the screw 30 and the gear 34 is mounted on a transverse shaft 35 which is rotatable by a manually operable crank 36 to raise or lower the prop structure 20.

Rigidly secured to and on the underside of the trailer frame side members 16 there is a metallic plate 38, adjacent the forward end of the frame, the plate 38 being provided with a king pin receiving slot 39 which preferably diverges, as at 40, at the front edge of the plate. Seating on and rigidly secured to the plate 38 there is an open ended, vertically extending tubular member 41 in which is guided a vertically movable king pin 42. The tubular member 41 is provided in the side wall thereof with a vertically extending slot 43 through which one end of a lever 44 projects into the tubular member 41 and is pivoted to the king pin 42 by a transverse pin 45. As shown in Fig. 2, an upper end portion of the king pin 42 is bifurcated to receive the lever end which is provided with a slot 46 to receive the pin 45 so as to permit relative pivoting movement and vertical movement respectively of the lever and the king pin.

The lever 44 extends longitudinally of the trailer immediately over the king pin receiving slot 39, the lever 44 having a bifurcated forward end portion 47 pivoted to a pair of transversely spaced brackets 48 which are rigidly secured to and depend from the front cross member 17 of the trailer frame. The bifurcated lever 44 is provided with arms 44ᵃ which extend forwardly of the lever fulcrum and slightly downwardly when the king pin 42 is in its raised position, as shown in Fig. 4. Intermediate its ends, the lever 44 is provided on its bifurcated portion 47 with downwardly facing angular cam surfaces 50 extending longitudinally of and provided on the lower edges of the bifurcated portions, the purpose of the cams being hereinafter explained in connection with the tractor shown in Figs. 3 and 4.

Pivoted to the tractor fifth wheel plate 13, below the upper surface thereof, a pair of coupling members 52 are provided respectively on opposite sides of the slot 14 for cooperation with the king pin 42 to couple the vehicles together. The coupling members 52 are provided respectively with arms 53 having rounded end surfaces cooperable to provide a socket for the king pin 42. Also, the coupling members 52 are provided with arms 54 which are connected respectively by links 55 to a toggle member 56 which is manually operable for moving the coupling arms 53 apart to release the king pin or uncouple the vehicles. This toggle means is old in the tractor-trailer art, and, therefore, is not shown or described in detail. A pair of helical coil springs 58, respectively surround longitudinally reciproca guide rods 59 which are pivotally connected at their forward ends respectively to the arms 54 of the coupling members 52. The springs 58 are under compression and act to swing the coupling members 52 in directions to move the coupling or socket forming arms 53 toward each other.

Retractible safety stop members 60 are provided on the trailer for abutment with the forward end of the tractor fifth wheel thereby to prevent complete separation of the vehicles and resultant damage if, for any reason, the vehicles should become uncoupled. The safety stop members 60 are in the form of arms which are pivoted respectively to spaced, longitudinal frame members 61 which are disposed between the frame side members 16 and are rigidly secured to the first and second frame cross members 17. In their effective positions, the safety stop arms 60 extend below the trailer plate 38, as shown in Fig. 2, swinging movement of the stop arms 60 in clockwise directions being limited by stop members or pins 61ᵃ which are rigidly and respectively secured to the frame members 61. A pair of spaced longitudinally extending links or rods 62 have forward ends thereof pivotally connected respectively to the safety stop arms 60, the other ends of the links having each a longitudinal slot 63 which respectively receive transverse pins 63ᵃ secured in upper arms 64 of the prop structure legs 21. Rearwardly of the second frame cross member 17 a pair of helical coil springs 65 respectively surround the links or rods 62 having ends thereof abutting the rear surface of the second cross member 17 and having the other ends thereof seating against abutments or collars 66 provided on the links or rods 62. The springs 65 act through the links 62 to pivot the safety stop members 60 to their ineffective or raised positions, shown in Fig. 5, the positions of the stop members being determined by and in accordance with the position of the prop structure 20.

The trailer king pin guide tube 41 serves as a pivot for a coupling member 68 having a hook-like jaw 69, this type of coupling being provided to couple with a tractor shown in Figs. 3 to 6 inclusive, which tractor has a fifth wheel plate 13' supporting an upstanding king pin 71. It is to be understood that the trailer of Figs. 1 and 2 of the trailer of Figs. 3 to 6 are the same and that the tractors differ only with respect to the coupling means thereof. The coupling member 68 is preferably provided with an integral, laterally extending arm 72 extending outside of one of the longitudinal frame members 16 through a longitudinal slot 70ᵃ therein. The slot 70ᵃ is provided at one end thereof with an upward offset providing a latch 71ᵃ for the arm 72 to latch the coupling member in uncoupled position. Pivotally connected to the arm 72, adjacent the coupling member 68, a rod 73 is reciprocally guided in an aperture in the adjacent or second cross member 17 from the front end of the frame, and surrounding the rod 73, a helical coil spring 74 acts to swing the coupling member 68 in a counterclockwise direction, Fig. 3, to the position shown. This is the coupled position of the coupling member 68 having its hooked-like jaw 69 hooked around the king pin 71. The coupling member 68 is provided with a forwardly extending side cam surface 76 which is engageable by the tractor king pin 71 when the tractor is backd into the trailer, the king pin 71 swinging the coupling member clockwise to pass thereby, after which the spring 74 returns the coupling member to coupled position with the king pin 71.

The operation of uncoupling the tractor and trailer of Figs. 1 and 2 is as follows: The operator first, by means of the crank 36, lowers the prop structure 20, the rotation of the crank 36 in the proper direction causing the threaded rod or screw 30 to rotate in a corresponding direction with the result that the screw traveller tube 29 moves forward on the screw and swings the prop 20 down until the traveller engages the frame cross member 17ᵃ as a stop. When lowered, the prop assumes the position shown in Fig. 5, in which position the prop legs 21 extend substantially vertically with respect to the frame. During the lowering operation of the prop 20, the springs 65 move the links or rods 62 rearwardly in accordance with the prop movement which swings the safety stop member 60 counter-clockwise until the lower ends of the stop members are above the lower surface of the trailer plate 38 and thus may be cleared by the fifth wheel 13 upon separation of the vehicles. By means of the lever of the toggle 56, the operator spreads the jaw member 53 apart to release the king pin 42, the toggle 56 holding the jaw members apart until the operator drives the tractor away from the trailer. As the fifth wheel 13 of the tractor moves entirely from beneath the trailer plate 38, the front end of the trailer descends and is supported on the ground by the prop structure 20.

In the coupling operation, the tractor is backed beneath the trailer plate 38 and the forward end of the trailer is transferred to the tractor, the forward end of the trailer being raised, as shown in Fig. 5. As the tractor backs beneath the trailer, the depending trailer king pin 42, which normally descends to its lowered or effective position by gravity, enters the tractor fifth wheel slot 14 until the king pin is engaged by the end of the slot. The coupling jaws 53 are then moved inwardly automatically by the springs 58 toward each other, to positions in back of the king pin 42 to cooperate therewith for coupling the vehicles together, the jaws 53 being held in coupled positions by the springs 58. The prop 20 is raised by means of the crank operated screw 30 along which the traveller tube 29 now travels rearwardly, and, being connected to the prop, swings the prop upwardly. As the prop 20 is raised, the pivoting prop legs 21 push the links or rods 62 forwardly, which moves the stop member 60 down in positions for abutment by the tractor fifth wheel 13 to prevent complete separation of the vehicles in the event of failure of the coupling means therefor.

The operation of uncoupling the tractor and trailer, shown in Figs. 3 to 6 inclusive, is as follows: As previously mentioned, the trailer of Figs. 3 to 6 inclusive is the same in construction as the trailer of Figs. 1 and 2, and, therefore, the prop 20 and the safety stop members controlled thereby of Figs. 3 to 6 operate in the manner herein described in connection with Figs. 1 and 2. In Figs. 3 to 6 inclusive, after the prop 20 is lowered and the safety members 60 are retracted thereby, the operator by means of the lever 72 can swing or pivot the single coupling member 68 clockwise, Fig. 3, and position the lever 72 behind the latch 71a to hold the coupling member 68 in unlatched position. The tractor can now be driven away from the trailer and in so doing the trailer king pin 42 normally descends by gravity so as to be in coupling position in the event that the next tractor for the trailer has the type of coupling means shown in Figs. 1 and 2. However, if the king pin 42 should stick and thus fail to descend by gravity, the king pin 71 upon separation of the vehicles will strike the arms 44a of the lever 44 to start the king pin 42 down toward its lowered position. If the king pin 42 should stick such that it would not descend by gravity upon initial movement by the king pin 71, then the king pin 71 acting through the lever 44 will positively push the king pin 42 down to its effective position. After separation of the vehicles, the single jaw 68 will be returned to its normal or coupling position, shown in Fig. 1, by the spring 74 upon release of the jaw operating lever 72 from back of the latch 71a.

To couple the vehicles of Figs. 3 to 6 together, the tractor is backed into the trailer, the tractor king pin 71 entering the trailer plate slot 39. As the tractor continues to back into the trailer, the tractor king pin 71 engages the cam surfaces 50 of the lever 44 and swings the lever 44 in a counterclockwise direction, Fig. 2, raising the trailer king pin 42 up out of the way of the tractor fifth wheel plate until the pin 42 clears the plate upon which it is then held in an elevated position. Following this raising of the trailer king pin 42, the tractor king pin 71 engages the cam surface 76 of the single coupling member 68 and swings the coupling member 68 in a clockwise direction, Fig. 3, until the king pin 71 passes the hook jaw 69 of the coupling member, after which the spring 74 swings the coupling member 68 back into coupling relation with the tractor king pin 71. The prop 20 is now raised, as previously described, which positions the safety stop members 60 such that they will be engaged by the tractor fifth wheel in the event of failure of the coupling means whereby to prevent complete separation of the vehicles.

From the foregoing description it will now be seen that I have provided a new and improved trailer of a character which may be coupled either to a tractor having a king pin or to a tractor having coupling jaws. Also, it will be seen that in the present trailer the trailer king pin will always be automatically retracted when a tractor having a king pin is backed into a trailer. In addition, it will be seen that I have provided a trailer in which retractible safety stop means for preventing complete separation of the vehicles is operated by and in accordance with operation of the trailer's retractible prop structure.

Referring now to the modification shown in Figs. 8 and 9, a rear end portion of a tractor is shown including a frame 80 supported in part by rear wheels 81. Rigidly secured to the longitudinal frame members is a pair of upstanding brackets 82 on which a fifth wheel 83 is pivotally mounted, the fifth wheel having an upstanding king pin 84. The trailer includes a frame comprising spaced, longitudinal frame members 85 rigidly secured together by cross members 86, 87, 88, 89 and 90. Rigidly secured to and beneath the trailer frame cross members 86 and 87 there is a skid plate 91 for seating on the fifth wheel 83, the skid plate 91 having a longitudinally extending king pin receiving slot 92 which flares outwardly at the forward end of the plate, as at 93, which end of the plate preferably curves upwardly, as shown in Fig. 9.

A coupling member 94 is provided on the trailer for coupling with the king pin 84 and is pivoted or swiveled to an upstanding hollow tube 95 having a plate-like base 96 which seats on and is rigidly secured to the skid plate 91. The coupling member 94 has a forwardly extending hook-like jaw portion 97 having an angular extending side 98 for abutment by the king pin 84 when the tractor is backed under the trailer, whereby the coupling member 94 is swung back out of the way after which a helical coil spring 99 swings the coupling member back to hook around the king pin. The spring 99 surrounds a reciprocal rod 100 which is pivotally connected at one end thereof to an arm or handle 101 by means of which the coupling member 94 may be swung away from the king pin 84 to uncouple the vehicles. The rod 100 is slidably guided in an aperture in the frame cross member 87, the spring 99 having one end abutting the cross member 87 and having its other or forward end abutting a shoulder of the rod 100.

In order to provide for coupling of the trailer with a tractor having coupling means on the fifth wheel thereof instead of a king pin, a retractible king pin 102 is provided and retained in the hollow tube 95 to which the coupling member 94 is swiveled. The tube 95 is provided with a forwardly facing slot through its wall to receive one end of a lever 103 which extends into the tube 95 into an aperture in the pin 102 end is pivotally connected thereto by a transversely extending pin 104. By means of the lever 103, the king pin may be raised or lowered, as desired.

Rigidly secured on and to the trailer skid plate 91 there is a bracket 105 to which a safety jaw member 106 is pivoted or swiveled by a pin 107. The safety jaw 106 has an arm 108 adapted to project into the slot 92 to prevent complete separation of the tractor and trailer in the event that coupling of the vehicles is not effected or completed. The safety member 106 is provided with a second arm 109 which is pivotally connected by a link 110 to one arm of a lever 111 which is pivoted for horizontal swinging movement by a pin 112 to the trailer skid plate 91. The other arm of the lever 111 is connected to a longitudinally extending push rod 113 which has a lost-motion connection with the trailer prop, designated generally by the numeral 114.

The prop structure 114 includes a pair of laterally spaced prop members 115, 116 which are pivoted by a rod 117 which is supported by brackets 118 rigidly secured to the longitudinal frame members of the trailer. The prop member 115 is provided with an upwardly extending arm 120 carrying a laterally extending pin which engages in the elongated aperture or slot 121 of the rod 113 to provide for the lost-motion connection between the rod and prop structure. Adjacent the lower ends of the prop members 115, 116 a shaft 122 rigidly secures them together and mounted on the shaft are ground engaging wheels 123. The prop 114 is raised and lowered manually by means of a crank 124 which rotates a screw having a traveler member 125 connected by links 126 to the prop member 115, 116 adjacent the wheels 123. On the rod 113, a collar 126 provides an abutment for one end of a helical coil spring 127, the other end of which abuts the frame cross member 87. The spring 127 acts to move the rod 113 rearwardly when permitted to do so by the lowering of the prop which swings the safety member 106 back out of the king pin slot 92.

In the coupling operation, the tractor is backed beneath the trailer and the king pin 84 enters the slot 92 during which time the prop will be down and the safety member will consequently be held in its retracted position, out of the slot 92, by the spring 127. As the tractor continues to back under the trailer, the king pin 84 engages the angular edges of the coupling member counterclockwise, facing Fig. 8, to pass thereby after which the coupling member snaps back under the action of the spring 99 and hooks around the king pin 84 thus coupling the vehicles together. The prop is then raised by operating the crank which causes the traveler member to move rearwardly thus swinging the prop up about its supporting rod 117. As the prop is drawn upwardly the rod 113 is pushed forwardly against the action of the spring 127. This forward movement of the rod 113 pivots the lever 112 clockwise, facing Fig. 8, and through the link 110 which is drawn rearwardly, swinging the safety member 106 counterclockwise into the slot 92. In this position, the safety member 106 will be engaged by the king pin to prevent complete separation of the vehicles if for any reason coupling of the king pin 84 and the member 94 is not effected or completed. Since the safety member is moved to its effective position or position for abutment by the king pin 84 when the prop 114 is raised, it will be seen that there is no danger of the safety member being in its effective position when the tractor is being backed into the trailer, because during this operation the prop will always be down. In uncoupling the vehicles, the prop 114 is first lowered and then the coupling member is swung out of coupling relation with the king pin 84 by means of the handle 101. The lowering of the prop causes the safety member to be retracted so that the vehicles may be completely separated.

While I have shown and described my invention in some detail, it is to be understood that the same is to be limited only by the appended claims for many changes may be made without departing from the spirit and scope of the invention.

What I claim is:

1. In a trailer, supporting means, releasable coupling means on said supporting means and cooperable with a king pin on a tractor to couple the vehicles together, a retractible king pin on said supporting means, said second-named king pin having an effective position for cooperating with coupling means on a second tractor and having a retracted ineffective position, means on said supporting means operable to retract said second named king pin and means on the first tractor actuating said last-named means when the first tractor backed into connection with the trailer.

2. In a trailer, a frame, releasable jaw means on said frame and cooperable with a king pin on a tractor to couple the vehicles together, a substantially vertically movable king pin on said frame and descendible by gravity from an ineffective position to an effective position, said second-named king pin in its effective position being arranged to position in a fifth wheel tractor slot and cooperable with coupling means of the fifth wheel, and an engaging element carried in advance of the component coupling members operable in the presence of another king pin carried by the tractor to move the second-mentioned king pin to its inoperative position.

3. In a trailer, a frame, releasable jaw means on said frame and cooperable with a king pin on a tractor to couple the vehicles together, a substantially vertically movable king pin on said frame and descendable by gravity from an ineffective position to an effective position, said section to an effective position, said second-named king pin in its effective position being arranged to position in a fifth wheel tractor slot and cooperate with coupling means of the fifth wheel, means carried by said trailer to raise said second-named king pin to its ineffective position and actuated by and upon backing of the first-named tractor relative to the trailer, and means for positively moving said second-named king pin to its effective position and actuated by said first-named king pin.

4. In a trailer, a frame, a king pin carried by said frame and movable between effective and ineffective positions, said king pin being movable from the ineffective position to the effective position for cooperation with coupling means on a tractor, and an engageable element carried by the frame operable in the presence of a king pin on the tractor for moving the second-mentioned king pin to its inoperative position.

5. In a trailer, a frame, a king pin carried by said frame and movable between effective and ineffective positions, said king pin being movable from the ineffective position to the effective position for cooperation with coupling means on a tractor, and an engageable element carried by the frame operable in the presence of a king pin on the tractor for moving the second-mentioned king pin to its inoperative position.

6. In a trailer, a frame, a king pin carried by said frame, said king pin being movable by gravity from an upper ineffective position downwardly to an effective position for cooperation with coupling means on a tractor, and an engaging element carried in advance of the king pin operable in the presence of a king pin on the tractor coupling, means to move said first mentioned king pin to its inoperative position, said engaging element being operable for initially starting king pin toward its effective position.

7. In a trailer, a frame, a king pin carried by said frame, said king pin being movable downwardly from an ineffective position to an effective position for cooperation with coupling means on a tractor, a lever automatically operated by a different tractor backing beneath the trailer to move said king pin to its ineffective position, and coupling means carried by said frame and cooperable with a king pin on said second-named tractor.

8. In a trailer, a frame, a king pin carried by said frame, said king pin being movable from a raised ineffective position to a lowered effective position for cooperation with coupling means on a tractor, a lever on said frame and actuated by a king pin of a different tractor for moving said first-named king pin to its ineffective position, and coupling means on said trailer cooperable with said second-named king pin.

9. In a trailer, a frame, a king pin carried by said frame, said king pin being movable by gravity from a raised ineffective position to an effective lowered position for cooperating with coupling means on a tractor, a lever operatively connected to said king pin and fulcrumed on said frame, said lever being actuated by a king pin of a tractor backing beneath said frame to move said king pin to its ineffective position, coupling means on said frame cooperable with coupling means on the tractor when said first-named king pin is in its raised position, and means on said lever engageable by said second-named king pin to positively move said first-named king pin to its effective position.

10. In a tractor-trailer combination, a king pin carried by one element of said tractor-trailer combination and movable between effective and ineffective positions, said king pin being movable from ineffective position to effective position for cooperation with coupling means on the other of said elements, and an engageable element operable upon the presence of another king pin carried by the coupling means on the other of said elements whereby said first-mentioned king pin will be moved between its effective and ineffective positions.

11. In a tractor-trailer combination, a king pin carried by one element of said tractor-trailer combination and movable between effective and ineffective positions, said king pin being movable from ineffective position to effective position for cooperation with coupling means on the other of said elements, and an engageable element operable upon the presence of another king pin carried by the coupling means on the other of said elements whereby said first-mentioned king pin will be moved between its effective and ineffective positions.

12. In a vehicle having a tractor element and a trailer element and wherein one of said elements contains a king pin movable from effective position for engagement with a jaw on the other element to ineffective position, a king pin moving lever on said element having the movable king pin comprising, means for engaging the king pin and a cam engageable with means on said other element to move said lever to move said king pin to ineffective position upon backing of said elements into engagement with each other if both said elements contain king pins.

13. In a vehicle having a tractor element and a trailer element and wherein one of said elements contains a king pin movable from effective position for engagement with a jaw on the other element to ineffective position, a king pin moving lever on said element having the movable king pin comprising, means for engaging the king pin and a cam engageable with means on said other element to move said lever to move said king pin to effective position upon separation of said elements from coupled relation.

14. In a vehicle having a tractor element and a trailer element and wherein one of said elements contains a king pin movable from effective position for engagement with a jaw on the other element to ineffective position, a king pin moving lever on said element having the movable king pin comprising, means for engaging the king pin, a cam engageable with means on said other element to move said lever to move said king pin to ineffective position upon backing of said elements into engagement with each other if both said elements contain king pins, and a second cam engageable with means to move said lever to effective position upon separation of said elements from coupled relation.

SIDNEY B. WINN.